(12) United States Patent
Zhang et al.

(10) Patent No.: US 10,909,519 B2
(45) Date of Patent: Feb. 2, 2021

(54) FOOD ORDERING CONSOLE AND FOOD ORDERING DEVICE

(71) Applicant: Advanced New Technologies Co., Ltd., George Town (KY)

(72) Inventors: Mingwei Zhang, Hangzhou (CN); Fenghuan Gu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/812,205

(22) Filed: Mar. 6, 2020

(65) Prior Publication Data

US 2020/0402035 A1    Dec. 24, 2020

Related U.S. Application Data

(63) Continuation of application No. PCT/CN2020/070822, filed on Jan. 8, 2020.

(30) Foreign Application Priority Data

Jun. 24, 2019  (CN) .................... 2019 2 0957902 U

(51) Int. Cl.
*G06Q 20/20*  (2012.01)
*G06Q 30/06*  (2012.01)

(52) U.S. Cl.
CPC ......... *G06Q 20/204* (2013.01); *G06Q 20/209* (2013.01); *G06Q 30/0633* (2013.01)

(58) Field of Classification Search
CPC . H04M 1/725; H04M 1/0254; H04M 1/72527
(Continued)

(56) References Cited

U.S. PATENT DOCUMENTS 5,933,812 A *  8/1999  Meyer .................... G06Q 20/20
                                                                235/380
7,716,082 B1 *  5/2010  Blalock ................ G06Q 20/327
                                                                705/17
(Continued)

FOREIGN PATENT DOCUMENTS

CN        201278169        7/2009
CN        206505455        9/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Olusegun Goyea
(74) *Attorney, Agent, or Firm* — Fish & Richardson P.C.

(57) ABSTRACT

The present application provides a food ordering console and a food ordering device. The food ordering console includes a housing that comprises a front cover and a rear cover attached to the front cover, wherein the rear cover comprises a main body and a protrusion that extends from the main body towards a direction away from the front cover; and input and output (I/O) devices that comprises: a display, disposed between the front cover and the main body of the rear cover; and one or more of a printer and a scanner at least partially disposed between the front cover and the protrusion.

10 Claims, 9 Drawing Sheets

(58) Field of Classification Search
USPC ............. 455/557, 575.8; 705/15–18, 39, 64; 235/380, 483
See application file for complete search history.

(56) References Cited

U.S. PATENT DOCUMENTS

| | | | | |
|---|---|---|---|---|
| 2002/0087478 | A1* | 7/2002 | Hudd | H04M 17/00 |
| | | | | 705/64 |
| 2007/0258105 | A1* | 11/2007 | Puttaswamy | B41J 3/44 |
| | | | | 358/1.15 |
| 2014/0370946 | A1* | 12/2014 | Daniell | H04M 1/0283 |
| | | | | 455/575.8 |
| 2015/0340780 | A1* | 11/2015 | Pavageau | G06K 7/0073 |
| | | | | 439/327 |
| 2016/0191682 | A1* | 6/2016 | Filser | H04M 1/72527 |
| | | | | 455/557 |
| 2017/0214783 | A1* | 7/2017 | Filser | H04M 1/0254 |
| 2018/0151940 | A1* | 5/2018 | Jacquemont | H01H 13/83 |

FOREIGN PATENT DOCUMENTS

| | | |
|---|---|---|
| CN | 206532356 | 9/2017 |
| JP | 07175855 | 7/1995 |

OTHER PUBLICATIONS

Nakamoto, "Bitcoin: A Peer-to-Peer Electronic Cash System," www.bitcoin.org, 2005, 9 pages.
International Search Report and Written Opinion in PCT Appln No. PCT/CN2020/070822, dated Apr. 9, 2020, 16 pages (with full machine translation).

* cited by examiner

FOOD ORDERING CONSOLE AND FOOD ORDERING DEVICE

CROSS-REFERENCE TO RELATED APPLICATIONS

This application is a continuation of PCT Application No. PCT/CN2020/070822, filed on Jan. 8, 2020, which claims priority to Chinese Patent Application No. 201920957902.2, filed on Jun. 24, 2019, and each application is hereby incorporated by reference in its entirety.

TECHNICAL FIELD

The present application relates to the field of electronic devices, and in particular, to food ordering consoles and food ordering devices.

BACKGROUND

With the rapid development of the economy and the catering industry, people's catering consumption capabilities are continuously improved, and various new catering forms are emerging. Most of conventional restaurant ordering modes are mainly based on manual records. First, a waiter presents a menu to customers. The customers select a meal based on their own tastes and then orally tell the service personnel. The service personnel records ordering information of the customers and tells the ordering information to a person serving at the front desk to prepare the meal. This process is cumbersome and inefficient, and causes a waste of valuable human resources, and the customers lose the patience of waiting for the meal.

With the rapid progress of science and technologies, robots have gradually entered human daily lives. As robots, food ordering devices can effectively alleviate ordering problems of customers, improve restaurant efficiency, and reduce waiting time for customers. Based on these advantages of the food ordering devices, the food ordering devices are more frequently used in the catering industry.

SUMMARY

The present application provides improved food ordering consoles and food ordering devices.

An aspect of the present application provides a food ordering console, including: a housing, including a front cover and a rear cover assembled to the front cover, where the rear cover includes a mainbody of the rear cover and a protrusion part connected to the mainbody of the rear cover, and the protrusion part extends from the mainbody of the rear cover in a direction away from the front cover; and an interaction apparatus, including: a display screen component, assembled between the front cover and the mainbody of the rear cover; and an interaction assistance apparatus, assembled between the front cover and the protrusion part and at least partially accommodated in the protrusion part, where the interaction assistance apparatus includes at least one of a printer and a scanner.

Further, the scanner includes a code scanner.

Further, the protrusion part is disposed at the bottom of the rear cover, and the interaction assistance apparatus is disposed below the display screen component.

Further, the protrusion part and the mainbody of the rear cover are made in one-piece.

Further, the food ordering console includes an audio receiver, and the audio receiver is assembled to the housing.

Further, the rear cover can be rotated relative to the front cover to open and close.

Further, a side of the front cover and a side of the rear cover are rotatably hinged, and a lock is disposed on at least one of the front cover and the rear cover, where the lock locks the front cover and the rear cover when the front cover and the rear cover are closed, and is unlocked when the front cover and the rear cover are opened.

Further, the lock is disposed on the other side of at least one of the front cover and the rear cover relative to a side on which the front cover and the rear cover are hinged.

Another aspect of the present application provides a food ordering device, including a base; and the food ordering console, assembled to the base.

Further, the base includes a part holder, and the protrusion part of the food ordering console is inserted into the part holder.

In the implementations of the present application, the protrusion part is disposed on the rear cover of the food ordering console, and the interaction assistance apparatus includes at least one of the printer and the scanner, and is assembled between the front cover and the protrusion part and is at least partially accommodated in the protrusion part. As such, the food ordering console partially protrudes to assemble the interaction assistance apparatus, to make the food ordering console light and thin overall.

DESCRIPTION OF IMPLEMENTATIONS

Figure 1:
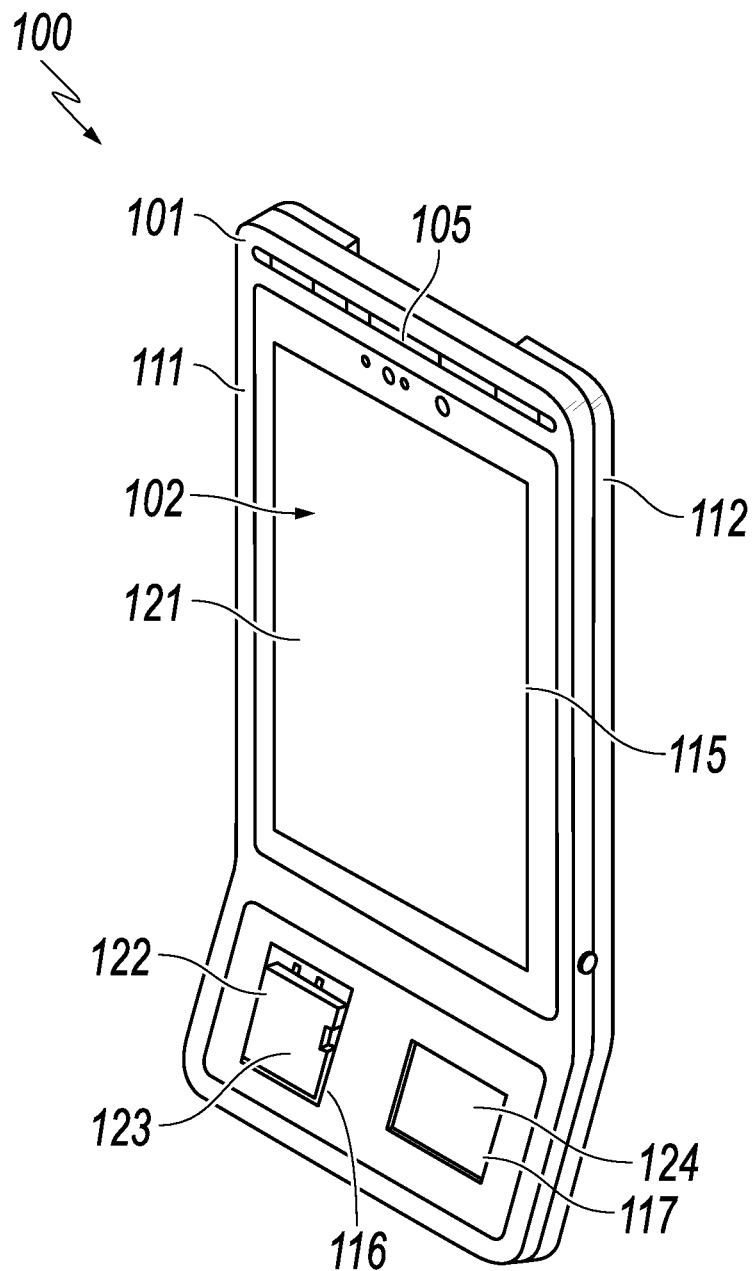
FIG. 1 is a schematic 3D diagram illustrating an implementation of a food ordering console, according to the present application.

Example implementations are described in detail here, and examples of the example implementations are presented in the accompanying drawings. When the following description relates to the accompanying drawings, unless specified otherwise, same numbers in different accompanying drawings represent the same element or similar elements. Implementations described in the following example implementations do not represent all implementations consistent with the present application. On the contrary, they are only examples of apparatuses that are described in the appended claims in detail and that are consistent with some aspects of the present application.

The terms used in the present application are merely used for the purpose of describing specific implementations, and are not intended to limit the present application. Unless otherwise defined, the technical terms or scientific terms used in the present application shall have general meanings understood by a person of ordinary skill in the art of the present application. The words "first" and "second" and similar words used in the specification and claims of the present application do not indicate any order, quantity, or importance, but are merely used to distinguish between different components. Similarly, similar words such as "one" or "a" do not indicate a quantity limitation, but indicate that at least one exists. Similar words such as "multiple" or "several" represent "two or more". Similar words such as "include" or "comprise" indicate that an element or an object preceding "include" or "comprise" covers an element or an object listed after "include" or "comprise" and their equivalents, and does not preclude other elements or objects. Similar words such as "connection" or "connected" are not limited to physical or mechanical connections, and can include both direct electrical connections and indirect electrical connections. The term "and/or" used in the present specification indicates and includes any or all possible combinations of one or more associated listed items.

A food ordering console in the implementations of the present application includes a housing and an interaction apparatus. The housing includes a front cover and a rear cover assembled to the front cover, the rear cover includes a mainbody of the rear cover and a protrusion part connected to the mainbody of the rear cover, and the protrusion part protrudes from the mainbody of the rear cover in a direction away from the front cover. The interaction apparatus includes a display screen component and an interaction assistance apparatus. The display screen component is assembled between the front cover and the mainbody of the rear cover. The interaction assistance apparatus is assembled between the front cover and the protrusion part and is at least partially accommodated in the protrusion part, and the interaction assistance apparatus includes at least one of a printer and a scanner.

In some implementations of the present application, the protrusion part is disposed on the rear cover of the food ordering console, and the interaction assistance apparatus includes at least one of the printer and the scanner, and is assembled between the front cover and the protrusion part and is at least partially accommodated in the protrusion part. As such, the food ordering console partially protrudes to assemble the interaction assistance apparatus, to make the food ordering console light and thin overall.

Figure 2:
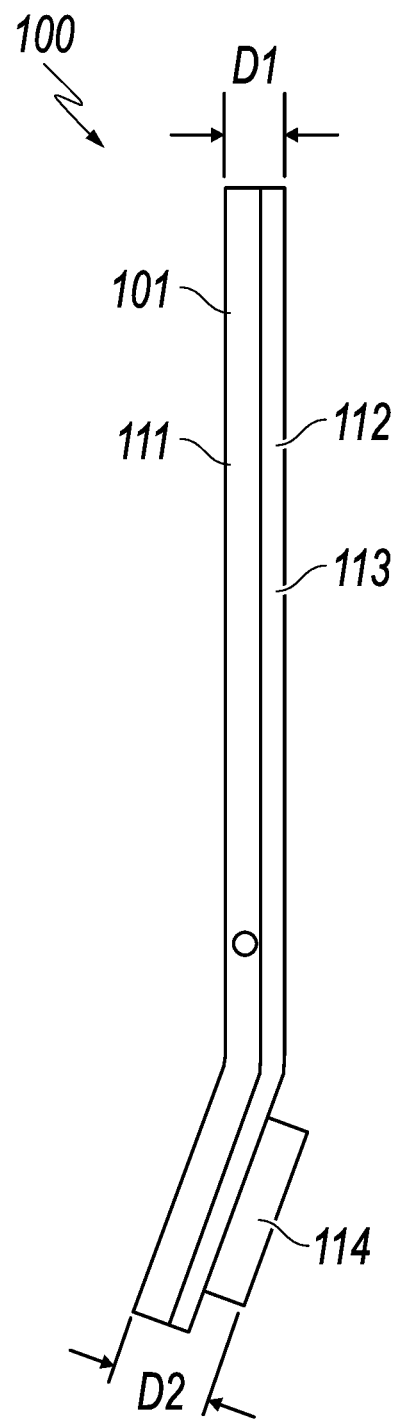
FIG. 2 is a right view illustrating the food ordering console shown in FIG. 1.
Figure 3:
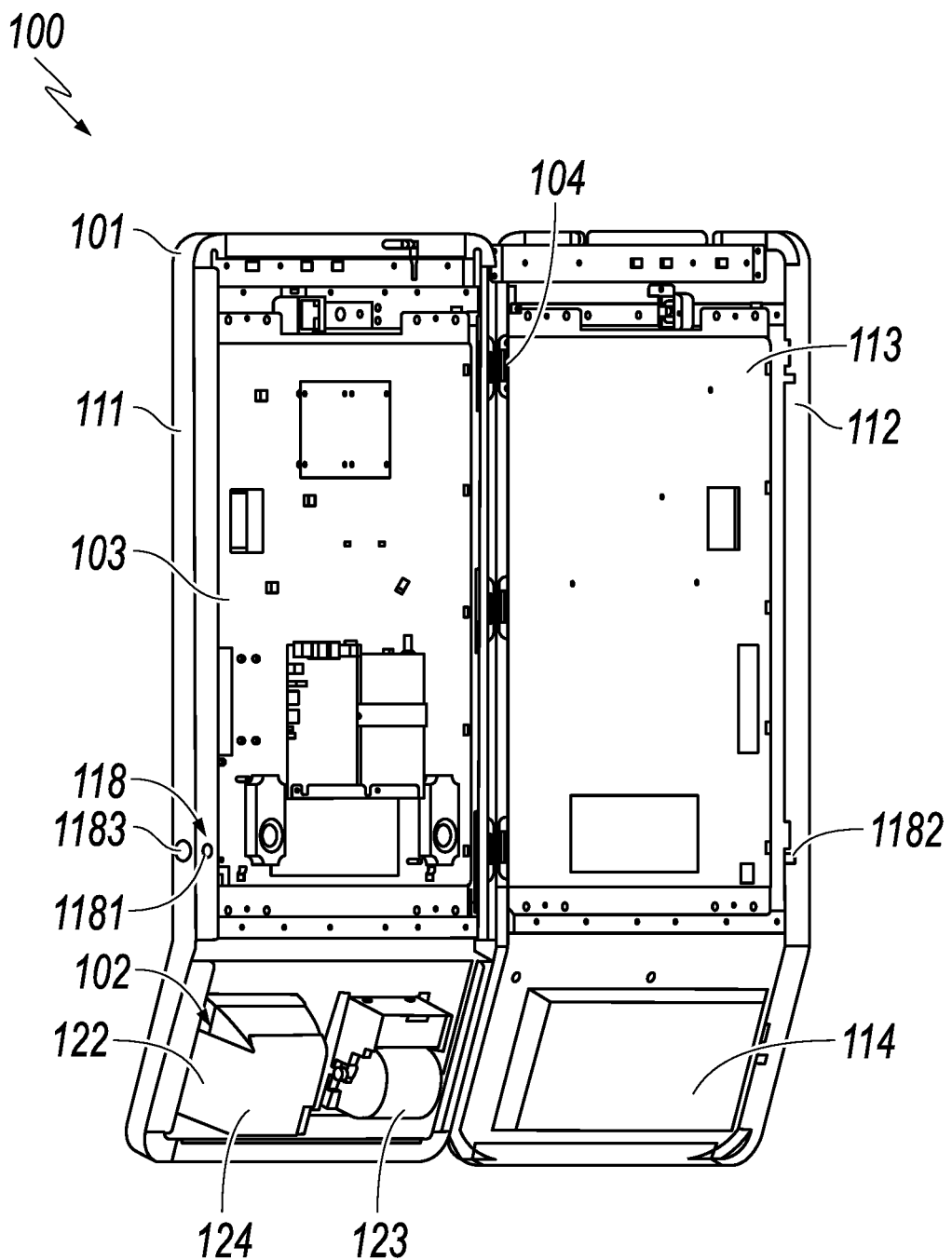
FIG. 3 is a schematic 3D diagram illustrating an open state of a front cover and a rear cover of the food ordering console shown in FIG. 1.

FIG. 1 is a schematic 3D diagram illustrating an implementation of a food ordering console 100. The food ordering console 100 can be used in the catering industry to provide users with self-service ordering, etc. The food ordering console 100 includes a housing 101 and an interaction apparatus 102. The housing 101 includes a front cover 111 and a rear cover 112 assembled to the front cover 111. FIG. 2 is a right view illustrating the food ordering console 100 shown in FIG. 1. FIG. 3 is a schematic 3D diagram illustrating an open state of the front cover 111 and the rear cover 112.

Referring to FIG. 1 to FIG. 3, the rear cover 112 includes a mainbody of the rear cover 113 and a protrusion part 114 connected to the mainbody of the rear cover 113, and the protrusion part 114 protrudes from the mainbody of the rear cover 113 in a direction away from the front cover 111. The interaction apparatus 102 includes a display screen component 121 and an interaction assistance apparatus 122. The display screen component 121 is assembled between the front cover 111 and the mainbody of the rear cover 113. The interaction assistance apparatus 122 is assembled between the front cover 111 and the protrusion part 114, and is at least partially accommodated in the protrusion part 114. The interaction assistance apparatus 122 includes at least one of a printer 123 and a scanner 124.

In some implementations of the present application, the protrusion part 114 is disposed on the rear cover 112 of the food ordering console 100, and the interaction assistance apparatus 122 is assembled between the front cover 111 and the protrusion part 114 and is at least partially accommodated in the protrusion part 114. As such, the food ordering console 100 partially protrudes to assemble the interaction assistance apparatus 122, to make the food ordering console 100 light and thin overall.

The front cover 111 faces users. A display screen opening 115 is disposed in the front cover 111, to make room for the display screen component 121. A first opening 116 and a second opening 117 are disposed in the front cover 111. The first opening 116 makes room for the printer 123, and the second opening 117 makes room for the scanner 124.

The rear cover 112 is assembled to the back of the front cover 111, facing away from users. In some implementations, thickness of the housing 101 is approximately the same as thickness D1 formed by assembling the mainbody of the rear cover 113 and the front cover 111, and thickness D2 formed by assembling the protrusion part 114 and the front cover 111 is larger than the thickness D1. Relatively thin components, such as a display screen component 121, can be accommodated between the mainbody of the rear cover 113 and the front cover 111. The thickness between the protrusion part 114 and the front cover 111 is large, and therefore the relatively thick interaction assistance apparatus 122 can be accommodated between the protrusion part 114 and the front cover 111. As such, the food ordering console 100 is light and thin overall, and partially protrudes to assemble a relatively thick apparatus.

In some implementations, the protrusion part 114 is disposed at the bottom of the rear cover 112, and the interaction assistance apparatus 122 is disposed below the display screen component 121, to facilitate users in operation. In some implementations, the bottom of the housing 101 extends downward and forward obliquely, to facilitate users in using the interaction assistance apparatus 122. In an implementation, a bottom end of the protrusion part 114 is higher than a bottom end of the housing 101.

In some implementations, the protrusion part 114 and the mainbody of the rear cover 113 are made in one-piece, to facilitate processing. In some other implementations, the protrusion part 114 is molded separately from the mainbody of the rear cover 113 and assembled to the mainbody of the rear cover 113. In an implementation, one protrusion part 114 can accommodate multiple interaction assistance apparatuses 122. In another implementation, multiple protrusion parts 114 can be disposed on the rear cover 112, to separately accommodate different interaction assistance apparatuses 122.

In some implementations, the rear cover 112 can be rotated relative to the front cover 111 to open and close, so that the rear cover 112 can be opened conveniently. As such, it is convenient to change the paper of the printer 123 and maintain internal components. In some implementations, a side of the front cover 111 and a side of the rear cover 112 are rotatably hinged, and a lock 118 is disposed on at least one of the front cover 111 and the rear cover 112. The lock 118 locks the front cover 111 and the rear cover 112 when the front cover 111 and the rear cover 112 are closed, and is unlocked when the front cover 111 and the rear cover 112 are opened. Hinges 104 are disposed between the front cover 111 and the rear cover 112, and the front cover 111 and the rear cover 112 are rotatably hinged by using the hinges 104. The front cover 111 and the rear cover 112 can be locked by using the lock 118, so that the front cover 111 and the rear cover 112 are fastened through closing. The lock 118 can be unlocked, so that the rear cover 112 can be opened relative to the front cover 111. As such, the rear cover 112 can be conveniently closed and opened.

In some implementations, the lock 118 is disposed on the other side of at least one of the front cover 111 and the rear cover 112 relative to a side on which the front cover 111 and the rear cover 112 are hinged. The lock 118 and the hinges 104 can be disposed on opposite sides, so that the lock 118 can better lock the front cover 111 and the rear cover 112. In some implementations, the lock 118 is disposed on the front cover 111. In some other implementations, the lock 118 is disposed on the rear cover 112. In some other implementations, the lock 118 is disposed on the front cover 111 and the rear cover 112.

In some implementations, the lock 118 includes a movable hook 1181 disposed on the front cover 111 and a hook socket 1182 disposed on the rear cover 112. When the front cover 111 and the rear cover 112 are closed, the hook 1181 is inserted into the hook socket 1182 and locked. An operation part 1183 connected to the hook 1181 is disposed on the front cover 111. When the front cover 111 and the rear cover 112 need to be opened, the operation part 1183 is operated to move the hook 1181 to be separated from the hook socket 1182, so that the hook 1181 is unlocked to open the rear cover 112. As such, closing and opening can be conveniently performed. In some implementations, the operation part 1183 can include a button, and the button is pressed to move the hook 1181. In some other implementations, the hook 1181 and the operation part 1183 are disposed on the rear cover 112, and the hook socket 1182 is disposed on the front cover 111.

The display screen component 121 can be securely assembled to the front cover 111. In some implementations, the display screen component 121 can be configured to display information such as a menu, prices, and prompt information. In some implementations, the display screen component 121 includes a touch display screen, which can be operated by users. Users can touch the touch display screen to perform ordering, select whether to print, select a payment method, etc.

In some implementations, the interaction assistance apparatus 122 includes the printer 123 and the scanner 124. The printer 123 is configured to print information such as a meal waiting number, a total order amount, and/or a merchant. The scanner 124 can be configured to scan devices (such as mobile phones), cards (such as bank cards or prepaid cards), etc. of users, to complete payment. In an implementation, the scanner 124 includes a code scanner for code scanning. The code scanner can scan a two-dimensional code, a barcode, etc. The code scanner 124 can scan a payment code displayed on user equipment, to complete payment.

In some other implementations, the printer 123 or scanner 124 can be omitted. In some other implementations, the interaction assistance apparatus 122 can include other apparatuses, such as a coin input apparatus configured to receive coins and/or banknotes, a coin output apparatus configured to output small change, or a keypad apparatus configured to enter passwords.

In an implementation, the food ordering console 100 includes a mainboard 103, assembled between the mainbody of the rear cover 113 and the front cover 111. The mainboard 103 can be securely assembled at the back of the display screen component 121, and is electrically connected to the display screen component 121. The mainboard 103 can be configured to control the display screen component 121, the interaction assistance apparatus 122, etc. In some implementations, the mainboard 103 can be connected to an external power supply, and can convert a voltage of the external power supply and supply power to the display screen component 121, the interaction assistance apparatus 122, etc.

In some implementations, the food ordering console 100 includes an audio receiver 105. As shown in FIG. 1, the audio receiver 105 is assembled to the housing 101. The audio receiver 105 can receive an audio, and the food ordering console 100 can recognize the audio perform ordering based on the audio, etc. As such, users can perform audio intelligent ordering, which is more convenient and can meet demands of more users. In an implementation, the audio receiver 105 can be assembled at the top of the housing 101, and can be located above the display screen component 121. In another implementation, the audio receiver 105 can be assembled at the bottom or other locations of the housing 101.

Figure 4:
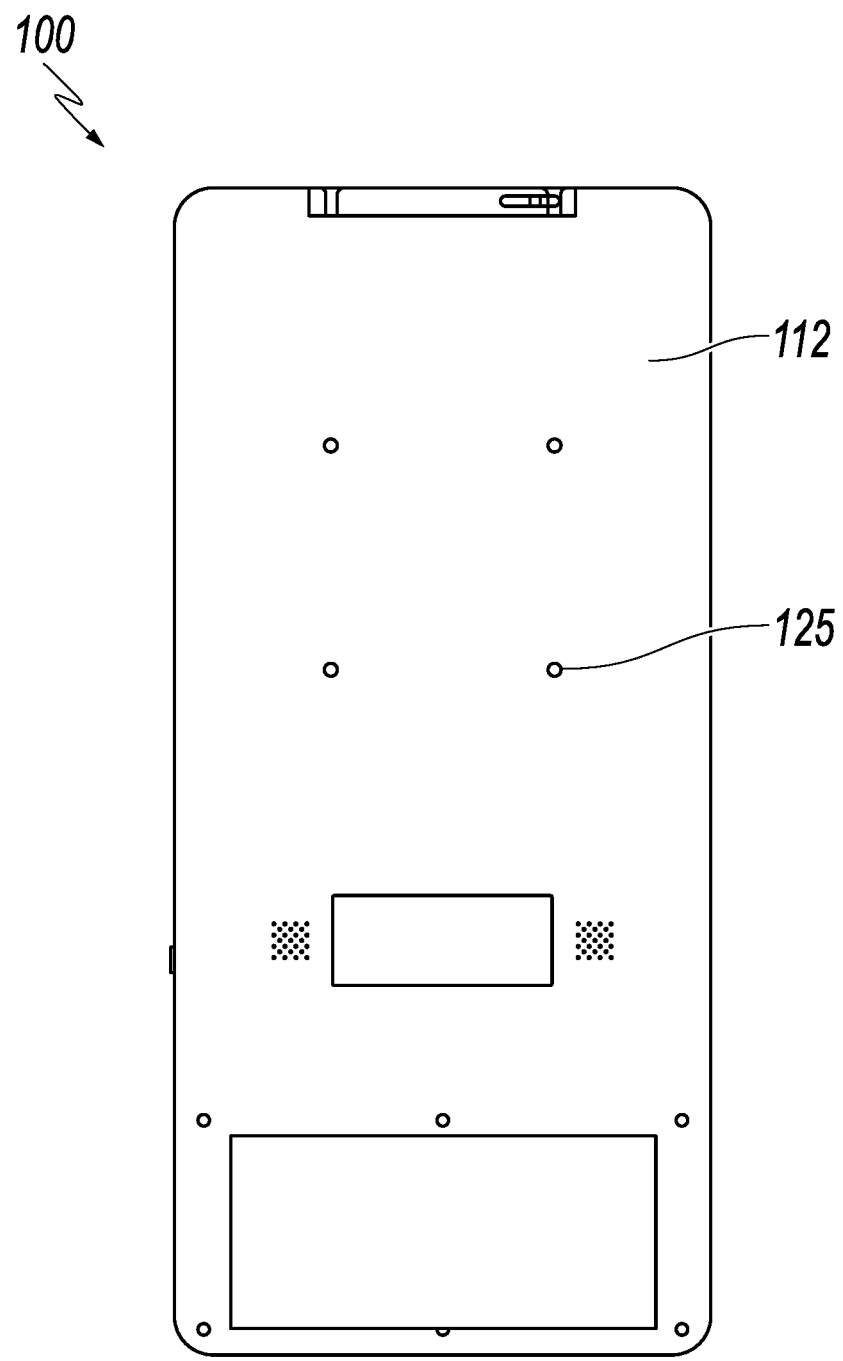
FIG. 4 is a rear view illustrating the food ordering console shown in FIG. 1.

FIG. 4 is a rear view of the food ordering console 100. The food ordering console 100 can be fastened to a wall, a pole, etc. Fastening holes 125 are disposed in the food ordering console 100 and can fit with fastening pieces (not shown), to fasten the food ordering console 100 to a wall or a pole. The fastening holes 125 can be screw holes, and the fastening pieces can be screws. In an implementation, the fastening holes 125 are disposed in the rear cover 112.

Figure 5:
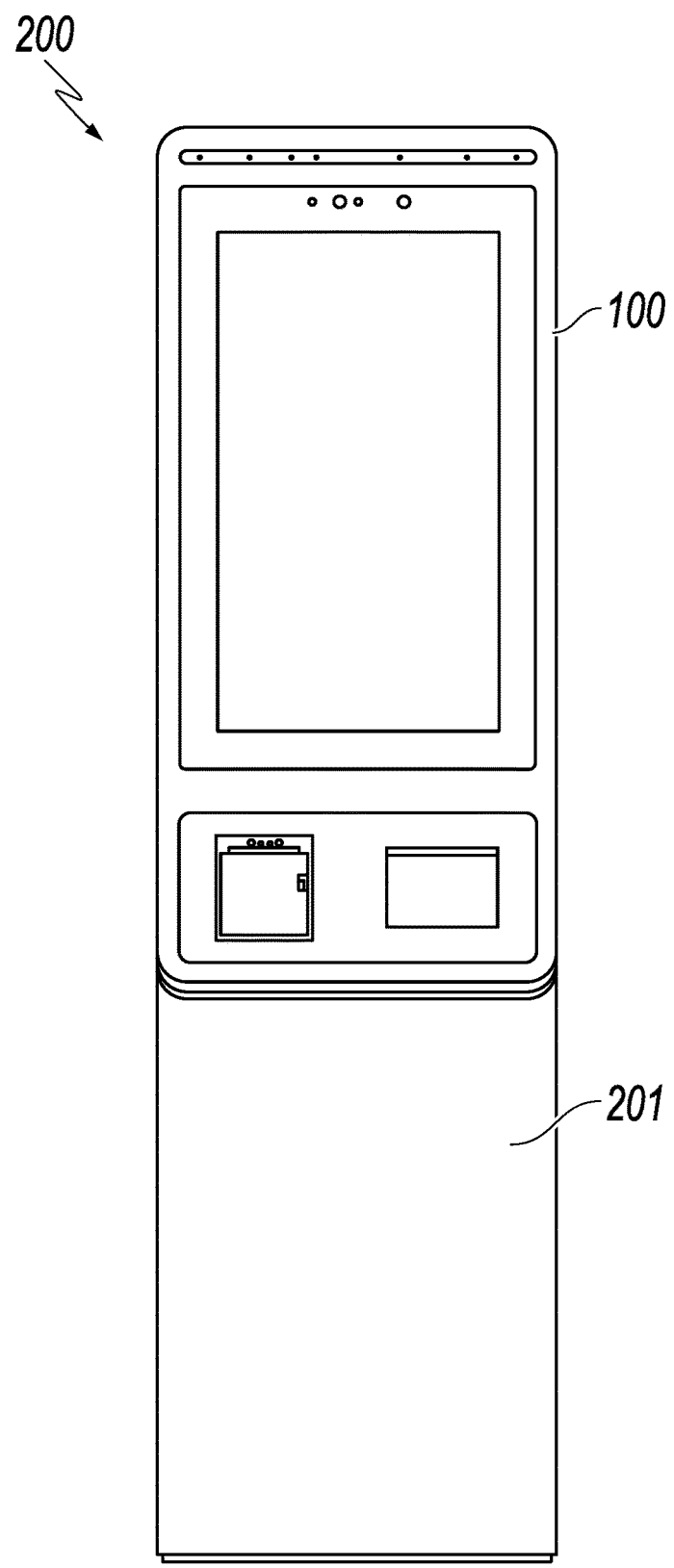
FIG. 5 is a schematic front view illustrating an implementation of a food ordering device, according to the present application.

FIG. 5 is a schematic front view illustrating an implementation of a food ordering device 200. The food ordering device 200 includes a base 201 and a food ordering console 100, and the food ordering console 100 is assembled to the base 201. In some implementations, the food ordering console 100 is assembled to an upper front side of the base 201. The base 201 can be placed on the ground to support the food ordering console 100. The food ordering console 100 can be the food ordering console in the previous implementation.

Figure 6:
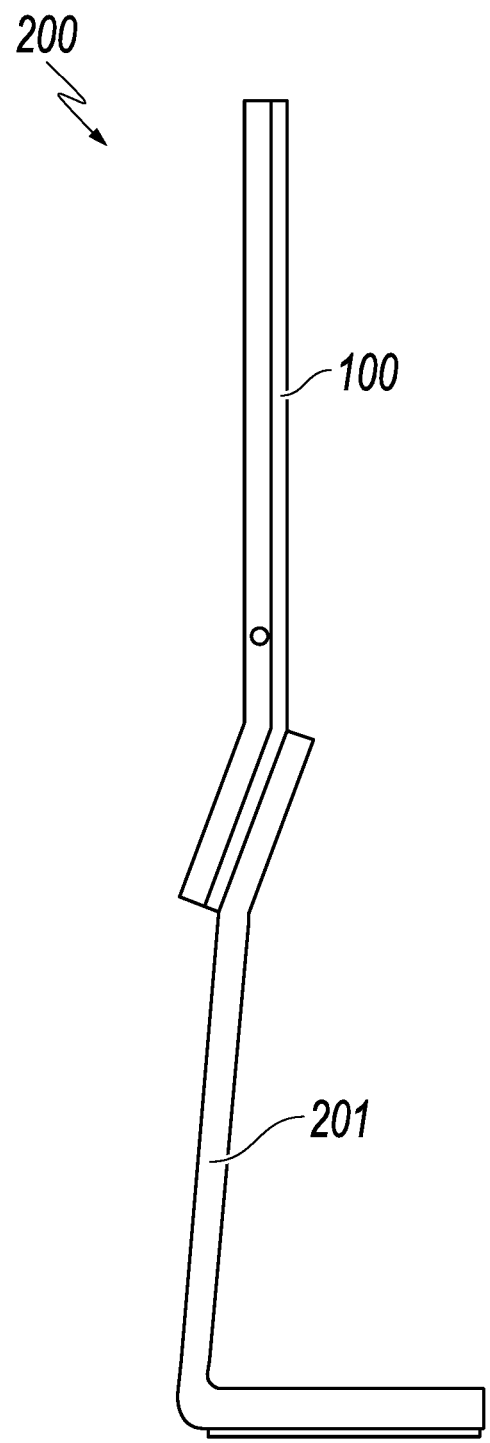
FIG. 6 is a right view illustrating the food ordering device shown in FIG. 5.
Figure 7:
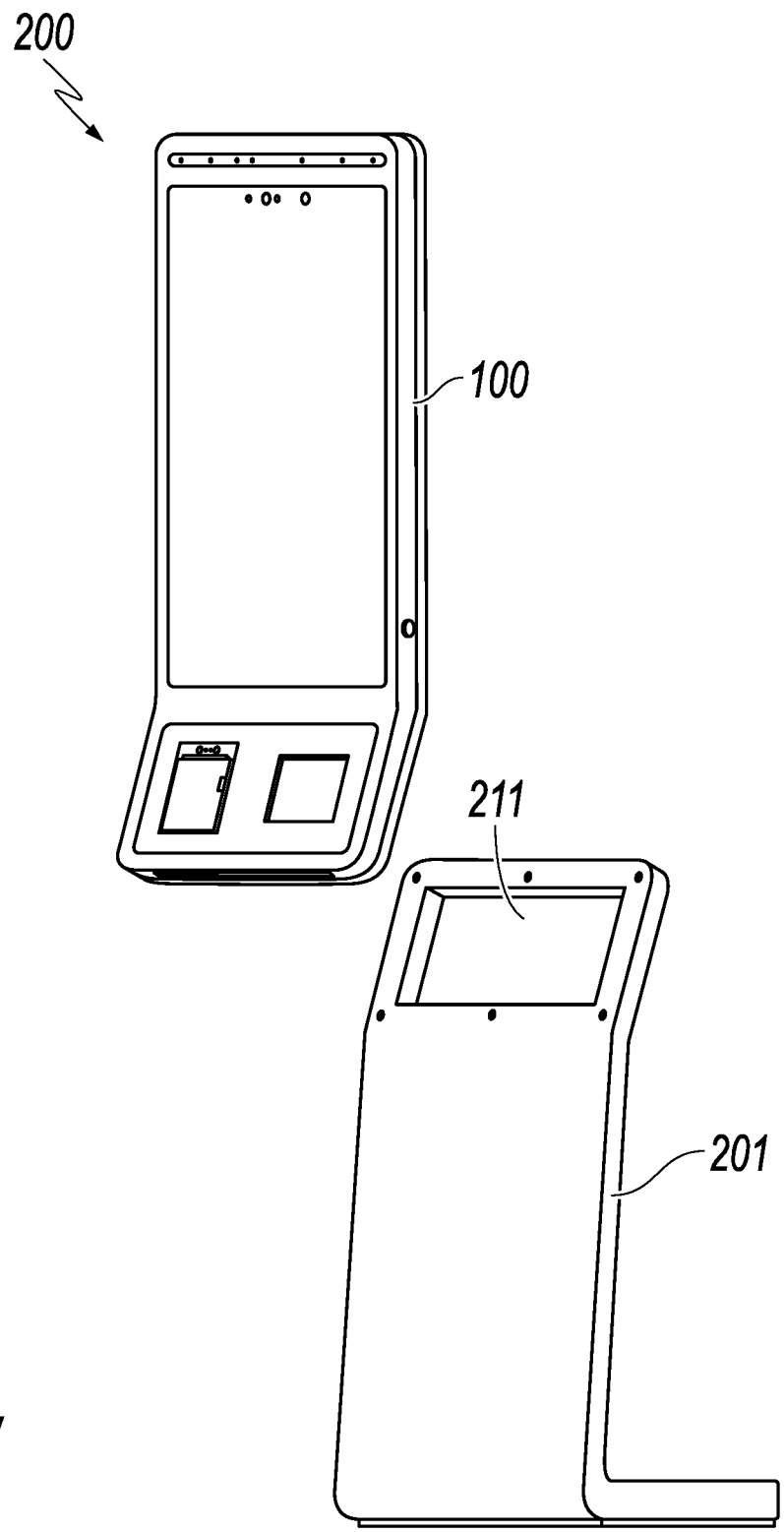
FIG. 7 is a front 3D exploded view of the food ordering device shown in FIG. 5.
Figure 8:
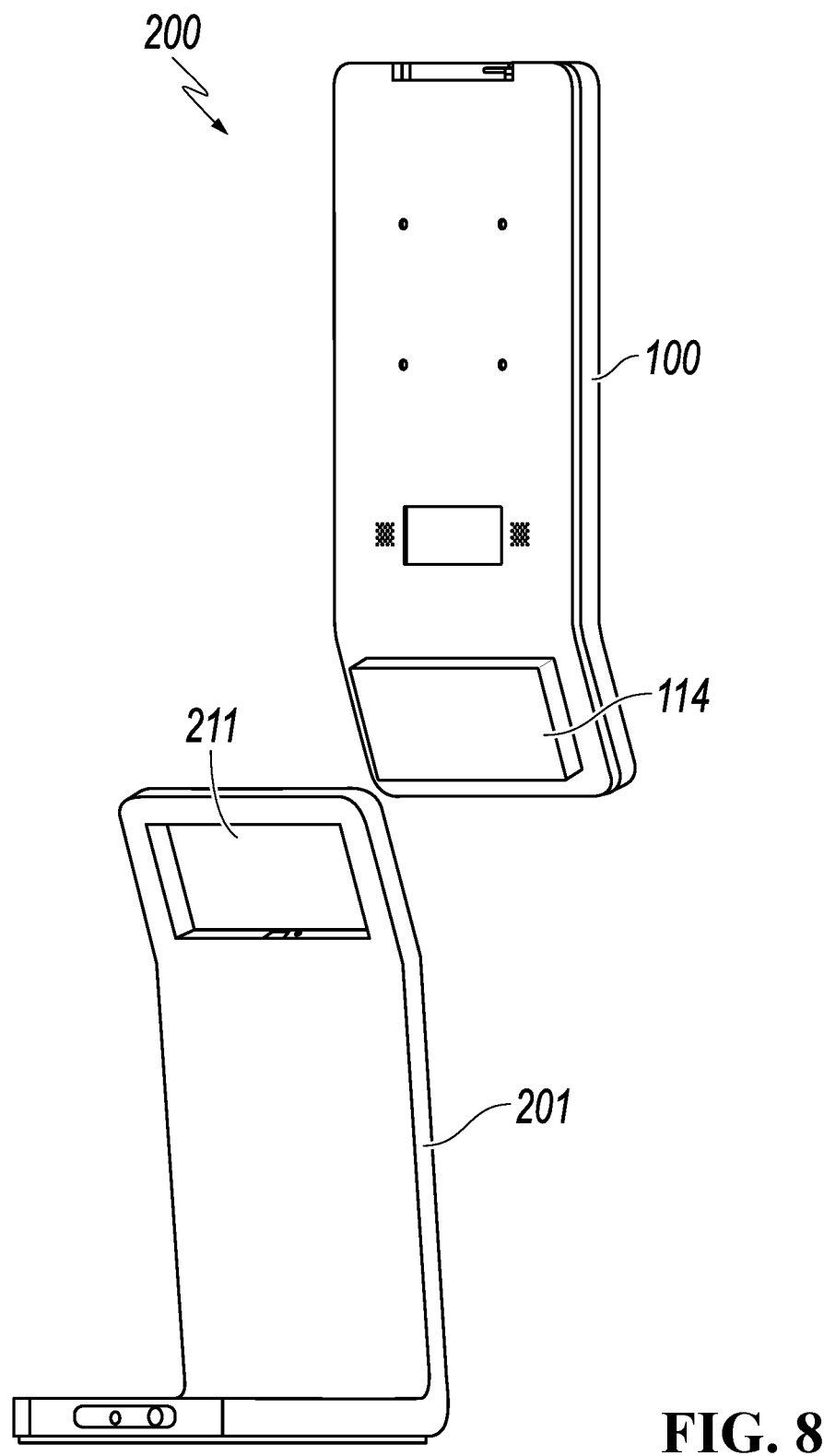
FIG. 8 is a rear 3D exploded view of the food ordering device shown in FIG. 5.
Figure 9:
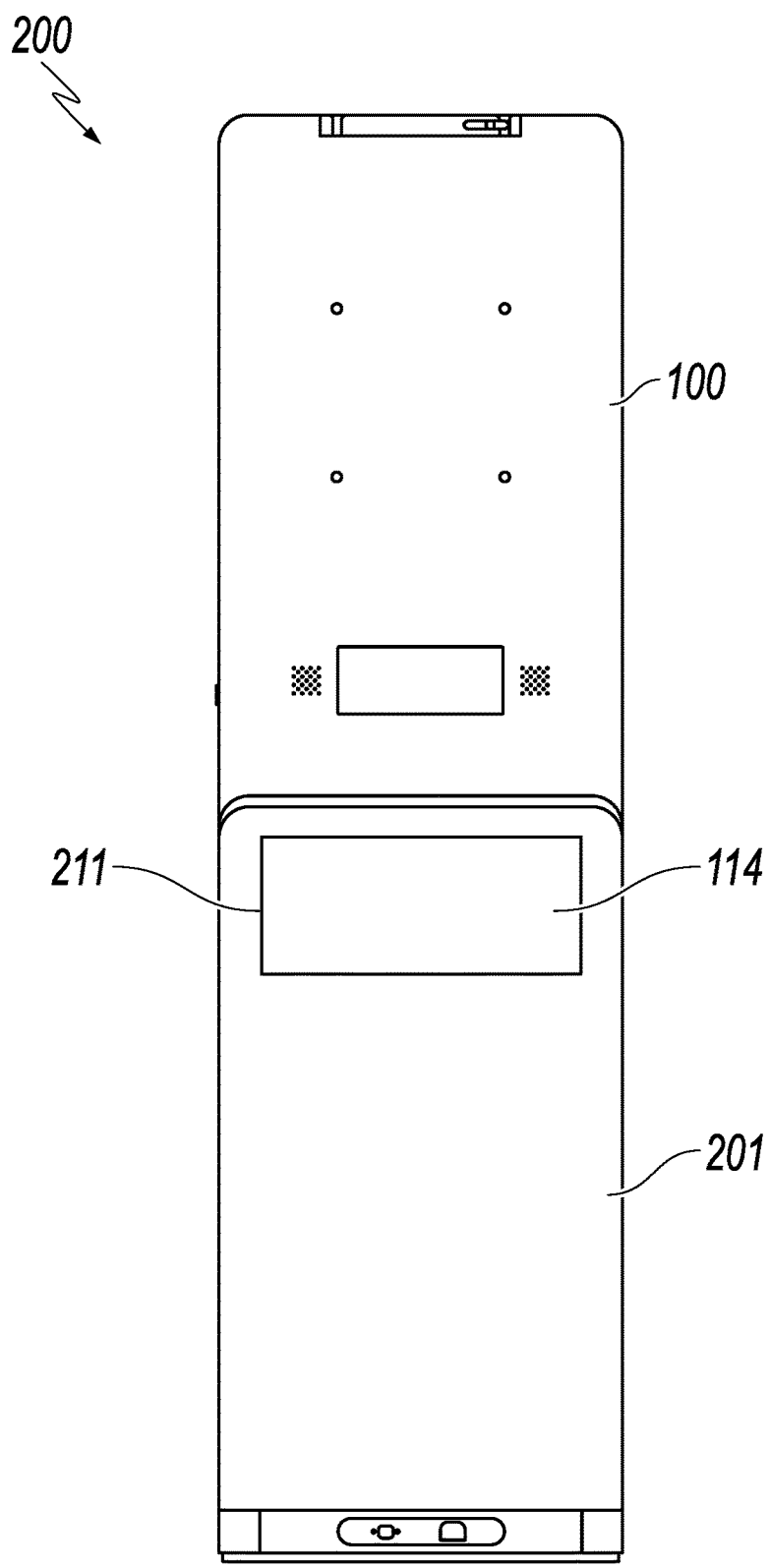
FIG. 9 is a rear view illustrating the food ordering device shown in FIG. 5.

FIG. 6 is a right view illustrating the food ordering device 200. FIG. 7 is a front 3D exploded view of the food ordering device 200. FIG. 8 is a rear 3D exploded view of the food ordering device 200. FIG. 9 is a rear view illustrating the food ordering device 200. Referring to FIG. 5 to FIG. 9, the base 201 includes a part holder 211, and the protrusion part 114 of the food ordering console 100 is inserted into the part holder 211. As such, the food ordering console 100 is securely assembled to the base 201, so that assembly is simple and convenient, and the base 201 can be made relatively thin. In an implementation, the part holder 211 can be a conducting groove. Thickness of the part holder 211 can be consistent with thickness of the protrusion part 114.

The previous descriptions are merely example implementations of the present application, but are not intended to limit the present application. Any modification, equivalent replacement, improvement, etc. made without departing from the spirit and principle of the present application shall fall within the protection scope of the present application.

What is claimed is:

1. A food ordering system, comprising:
an ordering machine console that comprises:
  a housing that comprises:
    a front cover; and
    a rear cover attached to the front cover, wherein the rear cover comprises a main body and a protrusion that extends from the main body in a direction away from the front cover;
a display, disposed between the front cover and the main body of the rear cover; and
one or more of a printer and a scanner that are at least partially disposed between the front cover and the protrusion, wherein the printer corresponds to a first opening disposed in the front cover that makes room for output from the printer, and the scanner corresponds to a second opening disposed in the front cover that makes room for input to the scanner; and
a base that comprises a part holder, wherein the protrusion of the ordering machine console is insertable to the part holder to securely assemble the ordering machine console to the base.

2. The food ordering system according to claim 1, wherein the scanner is a payment code scanner.

3. The food ordering system according to claim 1, wherein the protrusion is disposed below the main body of the rear cover.

4. The food ordering system according to claim 1, wherein the one or more of the printer and the scanner are disposed below the display.

5. The food ordering system according to claim 1, wherein the main body and the protrusion are integrally configured into the rear cover.

6. The food ordering system according to claim 1, wherein the ordering machine console further comprises a microphone disposed inside the housing.

7. The food ordering system according to claim 1, wherein the rear cover is attached to the front cover using a hinge to permit the front cover to be flipped open or closed.

8. The food ordering system according to claim 7, wherein a snap-fit joint is disposed on at least one of the front cover and the rear cover.

9. The food ordering system according to claim 8, wherein the snap-fit joint interlocks the front cover and the rear cover when the rear cover is flipped closed to the front cover.

10. The food ordering system according to claim 8, wherein the snap-fit joint is disposed on the at least one of the front cover and the rear cover and on a side of the at least one of the front cover and the rear cover that is opposite that of the hinge.

* * * * *

UNITED STATES PATENT AND TRADEMARK OFFICE
CERTIFICATE OF CORRECTION

PATENT NO. : 10,909,519 B2  
APPLICATION NO. : 16/812205  
DATED : February 2, 2021  
INVENTOR(S) : Mingwei Zhang and Fenghuan Gu Page 1 of 1

It is certified that error appears in the above-identified patent and that said Letters Patent is hereby corrected as shown below:

On the Title Page

Column 1, Line 1, item (30) (Foreign Application Priority Data), Delete "2019 2 0957902 U" and insert -- 201920957902.2 --, therefor.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*